United States Patent
Oga et al.

(10) Patent No.: US 11,708,771 B2
(45) Date of Patent: Jul. 25, 2023

(54) GAS TURBINE WITH REDUCED AXIAL DISPLACEMENT UNDER THERMAL EXPANSION

(71) Applicant: MITSUBISHI HEAVY INDUSTRIES, LTD., Tokyo (JP)

(72) Inventors: Kunihiro Oga, Tokyo (JP); Hironori Tsukidate, Tokyo (JP); Atsushi Sano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/665,791

(22) Filed: Feb. 7, 2022

(65) Prior Publication Data
US 2022/0316358 A1  Oct. 6, 2022

(30) Foreign Application Priority Data
Apr. 2, 2021 (JP) ................. 2021-063590

(51) Int. Cl.
*F01D 25/16* (2006.01)
*F02C 7/06* (2006.01)

(52) U.S. Cl.
CPC .............. *F01D 25/162* (2013.01); *F02C 7/06* (2013.01); *F05D 2220/32* (2013.01);
(Continued)

(58) Field of Classification Search
CPC ........ F01D 25/28; F01D 25/164; F01D 25/30; F02C 7/20; F02C 7/06; F05D 2240/52
See application file for complete search history.

(56) References Cited

U.S. PATENT DOCUMENTS 4,441,313 A * 4/1984 Joubert ................. B64D 27/26
248/556
5,810,558 A * 9/1998 Streeter ................... F16M 7/00
415/213.1

(Continued)

FOREIGN PATENT DOCUMENTS

DE    4313527 A1 * 10/1994 ........... F01D 25/162
JP    60-10838           1/1985
(Continued)

OTHER PUBLICATIONS

Office Action dated Feb. 8, 2023 in corresponding Japanese Patent Application No. 2021-063590, with English translation.

*Primary Examiner* — Topaz L. Elliott
(74) *Attorney, Agent, or Firm* — Wenderoth, Lind & Ponack, L.L.P.

(57) ABSTRACT

A gas turbine including a turbine driven by a combustion gas, a gas turbine casing that includes an exhaust casing having an inner tube and an outer tube, a bearing that rotatably supports a shaft of the turbine, a bearing casing that holds the bearing, a support leg that supports the gas turbine casing, struts that connect the inner tube and the outer tube, and a first support and a second support that support the bearing casing on the inner tube. The first support is located on a side same as the support leg relative to the struts in a flow direction of the combustion gas. The struts are located between the first support and the second support. The first support is fixed to the inner tube and the bearing casing. The second support is fixed to the inner tube and is in slidable contact with the bearing casing.

3 Claims, 3 Drawing Sheets

(52) U.S. Cl.
CPC ...... *F05D 2240/50* (2013.01); *F05D 2240/52* (2013.01); *F05D 2240/54* (2013.01)

(56) References Cited

U.S. PATENT DOCUMENTS

| | | | |
|---|---|---|---|
| 10,041,534 B2 * | 8/2018 | Ganiger | F04D 29/325 |
| 10,746,055 B2 * | 8/2020 | Sistaninia | F01D 25/24 |
| 10,844,745 B2 * | 11/2020 | Lefebvre | F16C 19/08 |
| 11,492,926 B2 * | 11/2022 | Lefebvre | F16C 27/04 |
| 2005/0050898 A1 | 3/2005 | Noda | |
| 2010/0303608 A1 | 12/2010 | Kataoka et al. | |
| 2011/0000222 A1 | 1/2011 | Black et al. | |
| 2014/0093358 A1 * | 4/2014 | Chang | F01D 25/246 |
| | | | 403/30 |
| 2017/0226894 A1 * | 8/2017 | Ganiger | F16C 27/04 |
| 2017/0292408 A1 * | 10/2017 | Sistaninia | F01D 25/24 |
| 2019/0055026 A1 * | 2/2019 | Sawyers-Abbott | B64D 27/26 |
| 2019/0093514 A1 * | 3/2019 | Hori | F01D 25/162 |
| 2020/0308982 A1 * | 10/2020 | Lefebvre | F16C 19/54 |
| 2020/0308983 A1 * | 10/2020 | Lefebvre | F16C 19/08 |
| 2020/0309143 A1 * | 10/2020 | Lefebvre | F01D 25/162 |
| 2022/0195889 A1 * | 6/2022 | Lefebvre | F01D 25/30 |

FOREIGN PATENT DOCUMENTS

| | | |
|---|---|---|
| JP | 2-199228 | 8/1990 |
| JP | 2005-083199 | 3/2005 |
| JP | 2008-82323 | 4/2008 |
| JP | 2009-057973 | 3/2009 |

* cited by examiner

GAS TURBINE WITH REDUCED AXIAL DISPLACEMENT UNDER THERMAL EXPANSION

BACKGROUND OF THE INVENTION

1. Field of the Invention

The present invention relates to a gas turbine.

2. Description of the Related Art

A gas turbine combusts by a combustor fuel mixed with compressed air compressed by a compressor, and the turbine is driven by the combustion gas to drive a driven machine such as a generator. The compressor and a shaft of the turbine are accommodated in a gas turbine casing. The gas turbine casing is, for example, supported by a base frame via a plurality of support legs in a posture with the shaft horizontal (Patent Document 1, etc.). The shaft is rotatably supported by bearings accommodated in a bearing casing (Patent Document 2, etc.).

PRIOR ART DOCUMENT

Patent Documents

Patent Document 1: JP-2009-57973-A
Patent Document 2: JP-2005-83199-A

SUMMARY OF THE INVENTION

Although not depicted in FIG. 2 of Patent Document 2 (paragraph 0023 of the document), the bearing casing is supported on an inner circumferential portion of the gas turbine casing through a support. In the case of the bearing casing elongated in the axial direction as in the document, the bearing casing may be supported at two positions in the axial direction by a first support and a second support. In addition, the gas turbine casing has a double structure including inner and outer casings for forming an annular combustion gas flow path, and the casing on the inner circumferential side and the casing on the outer circumferential side are connected through a support member called strut. The strut connecting the casing on the inner circumferential side with the casing on the outer circumferential side may be located between the first support and the second support. Besides, the bearing located on the downstream side relative to a turbine stage portion, such as the bearing depicted in Patent Document 2, is often located on the downstream side relative to each support leg that supports the gas turbine casing.

Of the first support and the second support described above, the second support generally located on the downstream side in the flow direction of the combustion gas has both ends fixed to the bearing casing and the gas turbine casing. On the other hand, the first support located on the upstream side is, for example, supported only on the gas turbine casing and is in slidably contact with the bearing casing. In addition, of the support legs for the gas turbine casing, for example, the support leg on the upstream side (compressor side) is set to be lower in rigidity than the support leg on the downstream side (turbine side). Such configuration and settings are for permitting a difference in thermal elongation in the axial direction of gas turbine component parts which make contact with a high-temperature working fluid.

In such a configuration, the gas turbine casing deformed by receiving heat from the working fluid is thermally elongated in the axial direction relative to the base frame, with the high-rigidity support leg on the downstream side as a reference point. Upon the present inventors' analysis of this thermal elongation, it has been found out that the strut is moved downstream with the support leg as a reference due to elongation of the casing on the outer circumferential side of the gas turbine casing and, further, the second support is moved downstream with the strut as a reference due to elongation of the casing on the inner circumferential side. When the strut and the second support are moved in the same direction in this manner, the moving amounts of the strut and the second support are added up, which may increase the moving amount of the bearing supported by the second support and, hence, a shaft end of the shaft supported by the bearing, relative to the support leg.

It is an object of the present invention to provide a gas turbine that can suppress the displacement amount of a shaft end of a shaft in the axial direction.

To achieve the above object, the present invention provides a gas turbine including a turbine driven by a combustion gas, a gas turbine casing that includes an exhaust casing having an inner tube and an outer tube, a bearing that rotatably supports a shaft of the turbine, a bearing casing that holds and covers the bearing, a support leg that supports the gas turbine casing, struts that connect the inner tube and the outer tube, and a first support and a second support that support the bearing casing on the inner tube. The first support is located on a side same as the support leg relative to the struts in a flow direction of the combustion gas. The struts are located between the first support and the second support in the flow direction of the combustion gas. The first support is fixed to both the inner tube and the bearing casing. The second support is fixed to the inner tube and is in slidable contact with the bearing casing.

According to the present invention, the displacement amount of a shaft end of a shaft of a gas turbine in the axial direction can be suppressed.

DESCRIPTION OF THE PREFERRED EMBODIMENT

Figure 1:
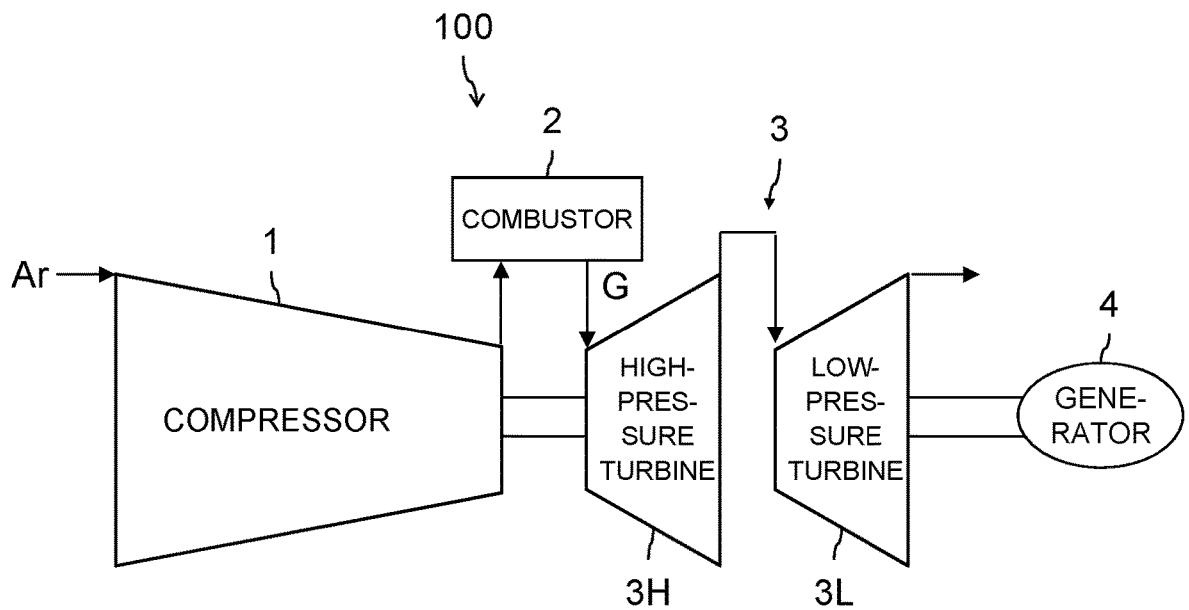
FIG. 1 is a schematic diagram depicting a gas turbine according to an embodiment of the present invention.

An embodiment of the present invention will be described below referring to the drawings.

—Gas Turbine—

FIG. 1 is a schematic diagram depicting a gas turbine according to an embodiment of the present invention.

The gas turbine (gas turbine engine) 100 depicted in FIG. 1 includes a compressor 1, a combustor 2, and a turbine 3. The compressor 1 and the turbine 3 are connected to each other by a shaft (not illustrated). In the present embodiment, a two-shaft turbine including a high-pressure turbine 3H and a low-pressure turbine 3L which are independently rotatable is adopted as an example of the turbine 3, and the compressor 1 is connected to the high-pressure turbine 3H. It is to be noted, however, that the turbine 3 may be of a single-shaft type. A generator 4 as a driven machine is connected to the low-pressure turbine 3L. Other driven machine such as a pump may be connected to the low-pressure turbine 3L, in place of the generator 4.

The compressor 1 is rotationally driven by the turbine 3 (high-pressure turbine 3H), sucks in air Ar, compresses the air Ar, and delivers high-temperature high-pressure compressed air. The combustor 2 mixes a fuel supplied from a fuel system (not illustrated) with the compressed air delivered from the compressor 1, combusts the mixed fuel, generates a high-temperature combustion gas G, and supplies the combustion gas G to the turbine 3 (the high-pressure turbine 3H and the low-pressure turbine 3L).

The turbine 3 (the high-pressure turbine 3H and the low-pressure turbine 3L) is rotationally driven by the combustion gas G supplied from the combustor 2. In the present embodiment, the high-pressure turbine 3H is driven by the combustion gas G from the combustor 2, and the low-pressure turbine 3L is driven by the combustion gas G having driven the high-pressure turbine 3H.

Figure 4:
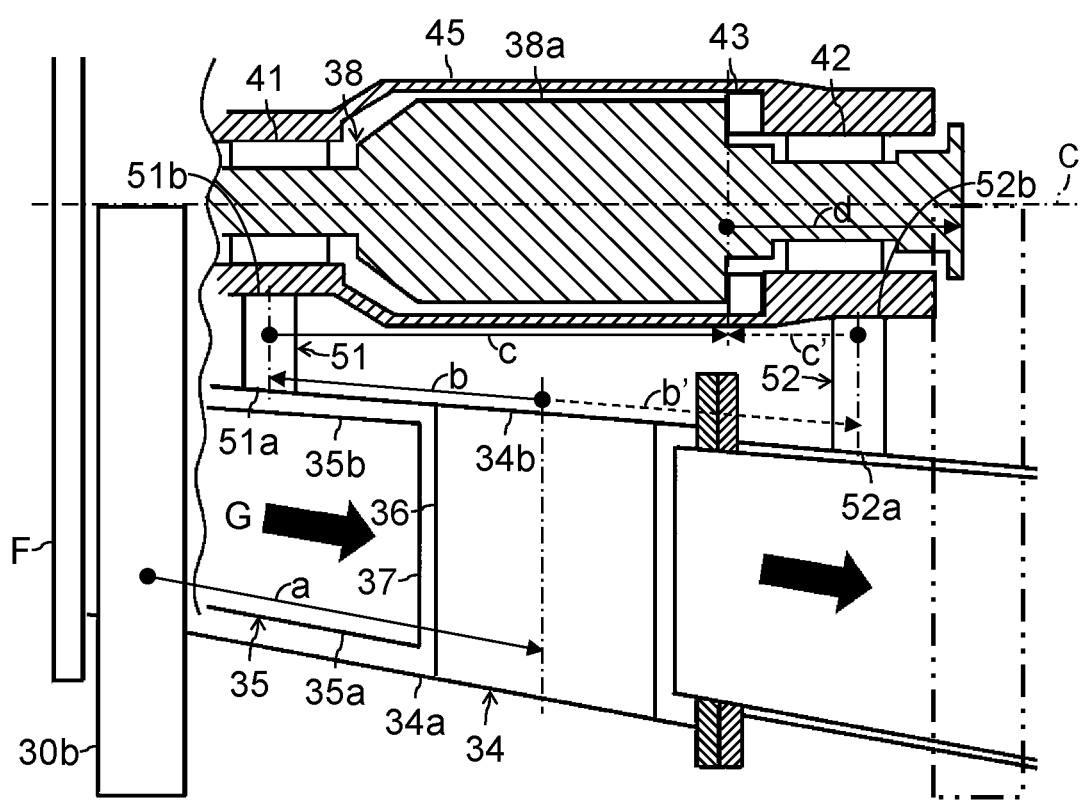
FIG. 4 is a diagram depicting, partly in section, an exhaust casing provided in the gas turbine depicted in FIG. 1.

The power outputted by the high-pressure turbine 3H thus driven is used for driving of the compressor 1. On the other hand, the power outputted by the low-pressure turbine 3L is converted into electric power by the generator 4. The combustion gas G having driven the turbine 3 is discharged to the atmosphere as an exhaust gas through an exhaust casing 34 (FIG. 4).

—Turbine—

Figure 2:
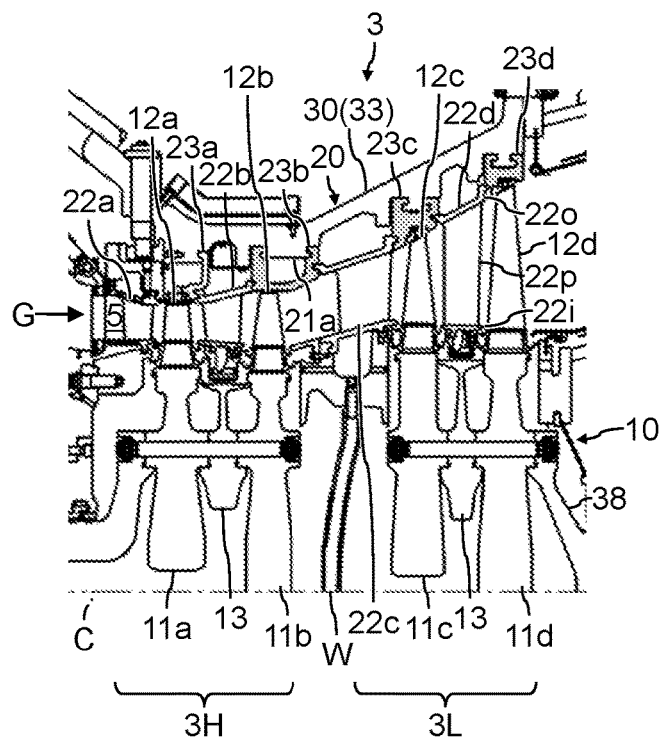
FIG. 2 is a diagram depicting a configuration example of an internal structure of a turbine provided in the gas turbine depicted in FIG. 1.

FIG. 2 is a diagram depicting a configuration example of an internal structure of the turbine 3.

As depicted in the diagram, the turbine 3 includes a turbine rotor 10 and a stationary body 20 covering the turbine rotor 10. Note that herein a rotating direction of the turbine rotor 10 is referred to as a "circumferential direction," a direction in which a rotational center line C of the turbine rotor 10 extends is referred to as an "axial direction," and a radial direction of the turbine rotor 10 is referred to as a "radial direction." In addition, the expression "upstream side" independently means the upstream side (left side in FIG. 2) of a flow direction (rightward direction in FIG. 2) of the combustion gas G in the axial direction. Similarly, the expression "downstream side" independently means the downstream side (right side in FIG. 2) of the flow direction of the combustion gas G in the axial direction.

The turbine rotor 10 includes rotor disks 11a to 11d and rotor vanes 12a to 12d.

The rotor disks 11a to 11d are disk-shaped members disposed overlappingly in the axial direction. In the present embodiment, the rotor disks 11a to 11d are laid over one another with spacers 13 appropriately interposed therebetween.

The rotor vanes 12a to 12d each have a plurality of vanes arranged on an outer circumferential surface of corresponding one of the rotor disks 11a to 11d at regular intervals in the circumferential direction to constitute an annular rotor vane row. The rotor vanes 12a to 12d extend radial-directionally outward from the respective outer circumferential surfaces of the rotor disks 11a to 11d, and front on a gas path 5 which is an annular main flow path of the combustion gas G. Respective rotor vane rows of the rotor vanes 12a, the rotor vanes 12b, the rotor vanes 12c, and the rotor vanes 12d are aligned in this order from the upstream side in the axial direction.

With the above configuration, fluid energy of the combustion gas G flowing in the gas path 5 is converted into rotational energy by the rotor vanes 12a to 12d, and the turbine rotor 10 is rotated around the rotational center line C. As mentioned above, the turbine 3 exemplified in the present embodiment is of the two-shaft type. The rotor vanes 12a and 12b constitute the high-pressure turbine 3H, and the rotor vanes 12c and 12d constitute the low-pressure turbine 3L. As depicted in FIG. 2, the high-pressure turbine 3H and the low-pressure turbine 3L have their shafts separated from each other with a partition wall W interposed therebetween, and the turbine rotor 10 can be rotated at different rotational speeds at a portion on the high-pressure turbine 3H side and a portion on the low-pressure turbine 3L side.

The stationary body 20 includes a turbine casing 33, stationary vanes (diaphragms) 22a to 22d, and turbine shrouds 23a to 23d.

The turbine casing 33 is a tubular member constituting an outer wall of the turbine 3 and surrounds the stationary vanes 22a to 22d, the rotor vanes 12a to 12d, and the turbine shrouds 23a to 23d. The turbine casing 33 is bisected to upper and lower parts. FIG. 2 depicts an upper half of the turbine casing 33. The stationary vanes 22a to 22d are mounted to inner circumferential portions of the turbine casing 33.

The stationary vanes 22a to 22d are segments, and each of the segments is integrally formed to include a stationary vane outer ring 22o, a stationary vane inner ring 22i, and a plurality of vane portions 22p. A plurality of such segments are aligned in the circumferential direction to constitute an annular stationary vane row. The stationary vane row of the stationary vanes 22a, the stationary vane row of the stationary vanes 22b, the stationary vane row of the stationary vanes 22c, and the stationary vane row of the stationary vanes 22d are aligned in this order from the upstream side in the axial direction.

The stationary vane outer ring 22o is a member an inner circumferential surface of which defines an outer circumference of the annular gas path 5. In each stationary vane row, a plurality of stationary vane outer rings 22o are aligned in the circumferential direction to form a tubular shape. The stationary vane outer ring 22o is supported on an inner circumferential portion of the turbine casing 33 through an appropriate member (in the present embodiment, a turbine shroud). The stationary vane inner ring 22i is disposed on a radial-directionally inner side relative to the stationary vane outer ring 22o. In each stationary vane row, a plurality of stationary vane inner rings 22i are aligned in the circumferential direction to form a tubular shape, to thereby define an inner circumference of the annular gas path 5 by their outer circumferential surfaces. The plurality of vane portions 22p are aligned in the circumferential direction, extend in the radial direction to connect the stationary vane inner ring 22i and the stationary vane outer ring 22o, and front on the gas path 5.

Note that the stationary vanes, and the rotor vanes located adjacent thereto on the downstream side thereof constitute one stage. A stage to which the stationary vanes 22a, the rotor vanes 12a, and the turbine shroud 23a belong is a first stage (initial stage). A stage to which the stationary vanes 22b, the rotor vanes 12b, and the turbine shroud 23b belong is a second stage. Similarly, a stage to which the stationary vanes 22c, the rotor vanes 12c, and the turbine shroud 23c belong is a third stage, and a stage to which the stationary vanes 22d, the rotor vanes 12d, and the turbine shroud 23d belong is a fourth stage (final stage).

—Gas Turbine Casing—

Figure 3:
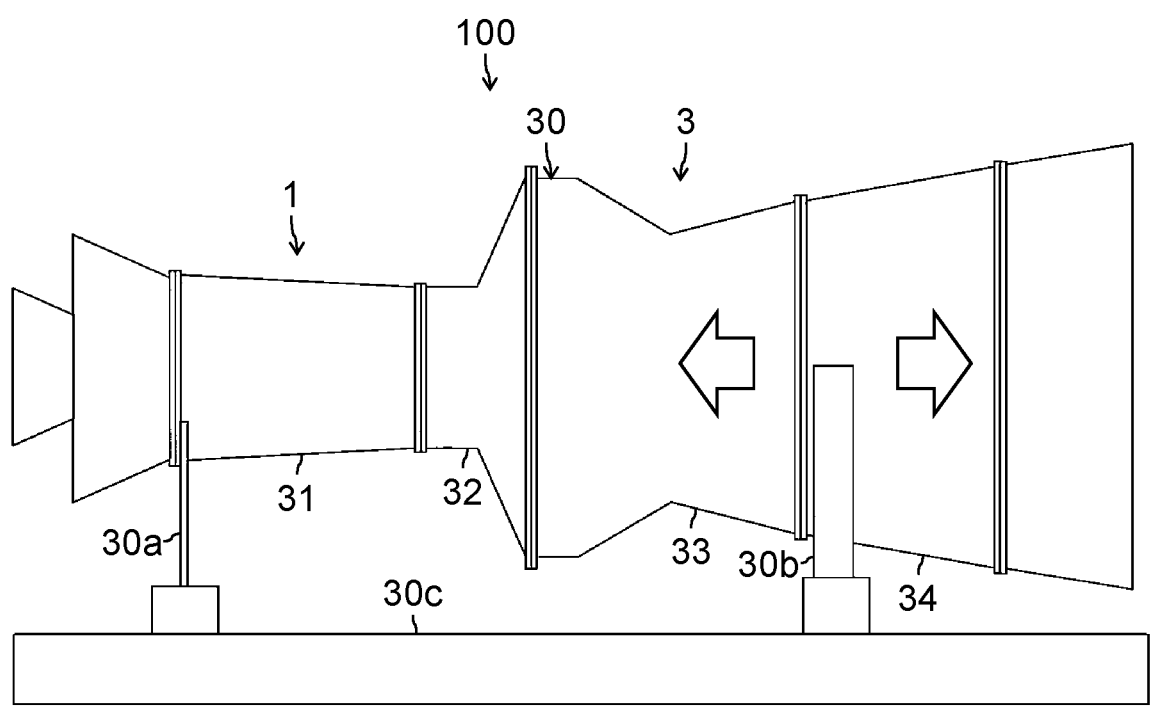
FIG. 3 is a schematic diagram depicting an appearance of the gas turbine depicted in FIG. 1.

FIG. 3 is a schematic diagram depicting an appearance of the gas turbine 100. In FIG. 3, the combustor 2 and the generator 4 are omitted from illustration.

A gas turbine casing 30 constituting an outer wall of the gas turbine 100 is a tubular member and includes a compressor casing 31, a combustor casing 32, the turbine casing 33, and the exhaust casing 34.

A rotor (not illustrated) of the compressor 1 is accommodated in the compressor casing 31. A plurality of combustors 2 are mounted to the combustor casing 32 in the circumferential direction. Rotors of the turbine 3 (respective rotors of the high-pressure turbine 3H and the low-pressure turbine 3L) are accommodated in the turbine casing 33 (FIG. 2). A downstream-side end portion of the compressor casing 31 is connected to an upstream-side end portion of the combustor casing 32 by a multiplicity of bolts. Similarly, with use of bolts, a downstream-side end portion of the combustor casing 32 is connected to an upstream-side end portion of the turbine casing 33, and a downstream-side end portion of the turbine casing 33 is connected to an upstream-side end portion of the exhaust casing 34.

The gas turbine casing 30 is supported by a base frame 30c, which is a basic structure, through support legs 30a and 30b.

The support leg 30a located on the upstream side is connected to the vicinity of an end portion of the compressor casing 31 on the upstream side. The support leg 30b located on the downstream side is connected to the vicinity of an end portion of the exhaust casing 34 on the upstream side. The support leg 30b on the downstream side may be connected to the vicinity of an end portion of the turbine casing 33 on the downstream side. While the support leg 30b is high in rigidity, the support leg 30a is set to be lower in rigidity against forces applied in the axial direction than the support leg 30b. As a result, at the time of operation of the gas turbine 100, thermal elongation of the gas turbine casing 30 due to heat from a working fluid is permitted. The gas turbine casing 30 is thermally elongated to both sides in the axial direction from the support leg 30b, with the portion restricted in position by the support leg 30b as a reference point (see arrows in FIG. 3).

FIG. 4 is a diagram depicting, partly in section, the exhaust casing 34. In the diagram, an internal structure of a lower half of the exhaust casing 34 is depicted together with the support leg 30b. The internal structure of the exhaust casing 34 is depicted in vertical sectional view including the rotational center line C of the turbine rotor 10.

As depicted in FIG. 4, the exhaust casing 34 includes an outer tube 34a and an inner tube 34b. The outer tube 34a is a conical member increasing in diameter in going downstream and is connected to a downstream-side end portion of the turbine casing 33 through a flange F. The inner tube 34b is a member which is accommodated in the outer tube 34a to form a space having a ring-shaped section between itself and the outer tube 34a, is conical in shape like the outer tube 34a, and is increasing in diameter in going downstream.

An exhaust diffuser 35 is provided in a space between the outer tube 34a and the inner tube 34b of the exhaust casing 34. The exhaust diffuser 35 includes an outer-circumferential-side diffuser 35a and an inner-circumferential-side diffuser 35b. The outer-circumferential-side diffuser 35a and the inner-circumferential-side diffuser 35b also are conical members increasing in diameter in going downstream. An exhaust passage having a ring-shaped section is formed between the outer-circumferential-side diffuser 35a and the inner-circumferential-side diffuser 35b.

The combustion gas G (namely, the exhaust gas) having driven the turbine 3 (the high-pressure turbine 3H and the low-pressure turbine 3L) flows in the exhaust passage formed by the exhaust diffuser 35. During operation of the gas turbine 100, the static pressure of the combustion gas G having passed through the turbine 3 is lowered to a negative pressure (for example, on the order of 0.09 MPa), but is recovered to the atmospheric pressure by passing through the exhaust diffuser 35.

The outer tube 34a and the inner tube 34b of the exhaust casing 34 are connected by struts 36 at a plurality of portions in the circumferential direction. The struts 36 are each a columnar member extending in the radial direction. The section of each strut 36 is elongate in the flow direction of the combustion gas G (exhaust gas). These struts 36 are each covered by a strut cover 37. The strut covers 37 are located correspondingly to the struts 36 and connect the outer-circumferential-side diffuser 35a and the inner-circumferential-side diffuser 35b at a plurality of portions in the circumferential direction.

A shaft 38 of the turbine rotor 10 is connected to an end surface on the downstream side of the rotor disk 11d at the final stage of the low-pressure turbine 3L (see also FIG. 2). The shaft 38 is rotatably supported by journal bearings 41 and 42 and a thrust bearing 43.

In the present embodiment, the journal bearings 41 and 42 and the thrust bearing 43 are all located on the downstream side relative to stage portions (the rotor disks 11c and 11d and the rotor vanes 12c and 12d) of the low-pressure turbine 3L. In other words, the stage portions of the rotor of the low-pressure turbine 3L are overhung (FIG. 2). Therefore, for the purpose of resolving imbalance of weight distribution in the axial direction, the shaft 38 is provided with a weight (counterweight) 38a.

The journal bearings 41 and 42 are disposed on opposite sides of the weight 38a in the axial direction and support the shaft 38. The weight 38a is a part of the shaft 38 and is enlarged in diameter as compared to those portions of the shaft 38 which are supported by the journal bearings 41 and 42. The thrust bearing 43 supports an end surface of the weight 38a on the downstream side.

The journal bearings 41 and 42 and the thrust bearing 43 are held by a common bearing casing 45, and outer circumferences thereof are covered together with the weight 38a by the bearing casing 45. The bearing casing 45, which surrounds the journal bearings 41 and 42 and the thrust bearing 43 together with the weight 38a, is required to have a suitable length in the axial direction. Therefore, the bearing casing 45 is supported on an inner circumferential surface of the inner tube 34b of the exhaust casing 34 at two positions in the axial direction by a first support 51 and a second support 52.

The first support 51 and the second support 52 are, for example, columnar members extending in the radial direction and are each disposed at a plurality of portions at a predetermined interval in the circumferential direction. The first support 51 is disposed at a position corresponding to the journal bearing 41 in the flow direction of the combustion gas G (axial direction). The second support 52 is disposed at a position corresponding to the journal bearing 42 in the flow direction of the combustion gas G (axial direction).

Further, the first support 51 is located on the side (in the present embodiment, the upstream side) same as the support leg 30b relative to the struts 36 in the flow direction of the combustion gas G (axial direction). In the example of FIG. 4, the first support 51 is located between the second support 52 and the support leg 30b. In addition, the struts 36 are located between the first support 51 and the second support 52 in the flow direction of the combustion gas G (axial direction).

Here, an end portion 51a of the first support 51 on the outer circumferential side is fixed to the inner circumferential surface of the inner tube 34b of the exhaust casing 34 by welding or bolts or the like. An end portion 51b of the first support 51 on the inner circumferential side is fixed to an outer circumferential surface of the bearing casing 45 by welding or bolts or the like. Thus, the first support 51 has both ends fixed respectively to the inner tube 34b of the exhaust casing 34 and the bearing casing 45.

An end portion 52a of the second support 52 on the outer circumferential side is fixed to the inner circumferential surface of the inner tube 34b of the exhaust casing 34 by welding or bolts or the like. On the other hand, an end portion 52b of the second support 52 on the inner circumferential side is not fixed to the outer circumferential surface of the bearing casing 45 and is free. Thus, the second support 52 is fixed to the inner tube 34b of the exhaust casing 34 while it is in slidable contact with the bearing casing 45, so that the second support 52 and the bearing casing 45 do not restrict each other in position.

Comparative Example

For comparison with the gas turbine 100 according to the present embodiment described above, a configuration in which the structures of the first support 51 and the second support 52 are interchanged is assumed. In other words, the second support 52 has its end portions 52a and 52b on both sides respectively fixed to the exhaust casing 34 and the bearing casing 45, whereas the first support 51 has its end portion 51a on the outer circumferential side fixed to the exhaust casing 34 and the other end portion 51b on the inner circumferential side being free.

As compared to a state in which the gas turbine 100 is stopped and the gas turbine casing 30 is at normal temperature, during operation of the gas turbine 100, temperatures of component parts of the gas turbine 100 are raised by the combustion gas G, and the component parts are thermally elongated. Directions of the thermal elongation that occur in the exhaust casing 34 are represented by arrows a to d in FIG. 4.

As described above, the support leg 30b is higher in rigidity than the support leg 30a, and therefore, the support leg 30b becomes a reference point for thermal elongation of the gas turbine casing 30 in the axial direction. Therefore, an end surface of the shaft 38 on the downstream side is moved in the axial direction with the support leg 30b as a reference. The moving amount in the axial direction is the sum total of the moving amount of the struts 36 relative to the support leg 30b, the moving amount of the second support 52 relative to the struts 36, the moving amount of the thrust bearing 43 relative to the second support 52, and the moving amount of the end surface of the shaft 38 relative to the thrust bearing 43.

In the comparative example, the struts 36 are moved to the downstream side, as indicated by solid-line arrow a, relative to the support leg 30b due to thermal elongation of the outer tube 34a of the exhaust casing 34. The second support 52 is moved further to the downstream side, as indicated by broken-line arrow b', relative to the struts 36 which are moved to the downstream side, due to thermal elongation of the inner tube 34b of the exhaust casing 34. Thereafter, the thrust bearing 43 is moved to the upstream side relative to the second support 52 (broken-line arrow c') due to thermal elongation of the bearing casing 45, and the end surface of the shaft 38 is moved to the downstream side relative to the thrust bearing 43 (solid-line arrow d) due to thermal elongation of the shaft 38.

It is to be noted that, of the thermal elongation indicated by the arrows a, b', c', and d, the elongation amounts (arrows a and b') of the outer tube 34a and the inner tube 34b of the exhaust casing 34, at which heat input from the combustion gas G is large, are large. The moving amount of the end surface of the shaft 38 is significantly influenced by the moving amount of the bearing casing 45 that is determined by the elongation amounts of the outer tube 34a and the inner tube 34b of the exhaust casing 34. In the case of the comparative example, the bearing casing 45 is restricted in position by the second support 52, so that the moving amount of the bearing casing 45 depends on the moving amount of the second support 52 relative to the support leg 30b. In the comparative example, the moving direction of the second support 52 is the downstream direction which is the same as that of the struts 36 (arrows a and b'), and therefore, the elongation amounts of the outer tube 34a and the inner tube 34b of the exhaust casing 34 are added with respect to the support leg 30b.

Advantageous Effects (1) In the present embodiment, the first support 51 is located on the upstream side, same as the support leg 30b, relative to the struts 36. Therefore, the first support 51 is moved to the upstream side, as indicated by solid-line arrow b, relative to the struts 36 due to thermal elongation of the inner tube 34b of the exhaust casing 34. Since the first support 51 is moved in the direction opposite to the struts 36 (arrows a and b), its moving amount in the axial direction relative to the support leg 30b is small as compared to the second support 52 which is moved in the direction same as the struts 36 (arrows a and b').

In the case of the present embodiment, the bearing casing 45 is restricted in position by the first support 51 but is set free with respect to the second support 52. Therefore, the moving amount of the bearing casing 45 depends on the moving amount of the first support 51 relative to the support leg 30b. It is to be noted that, in the present embodiment, in contrast to the comparative example, the thrust bearing 43 is moved to the downstream side relative to the first support 51 due to thermal elongation of the bearing casing 45. Therefore, in comparison with the comparative example, the restraining amount of movement of the bearing casing 45 does not coincide with the restraining amount of movement of the end surface of the shaft 38. However, the thermal elongation amount of the bearing casing 45 is smaller than the thermal elongation amount of the exhaust casing 34.

Putting the above-described points together, according to the present embodiment, movement of the bearing casing 45 relative to the support leg 30b can be suppressed as compared to the comparative example. As a result, the displacement amount of the downstream-side end surface of the shaft 38 in the axial direction can be suppressed.

In addition, since the displacement amount of the shaft 38 can be suppressed, reliability of the rotating operation of the turbine 3 can be enhanced. Besides, a device (for example, diaphragm coupling) for absorbing the movement of the end surface of the shaft 38 is applied in some cases. In such a case, specifications required of the device can be lowered, which can contribute to reduction in device cost.

(2) The gas turbine 100 according to the present embodiment is a two-shaft gas turbine, and the stage portions of the low-pressure turbine 3L are overhung with respect to the bearings (all of the journal bearings 41 and 42 and the thrust bearing 43) as described above (FIG. 2). In other words, there is no element that restricts the shaft 38 in position, on the upstream side of the stage portions, so that the stage portions are also moved in the axial direction together with the shaft 38 attendant on the movement of the bearing casing 45. In this case, when a sealing structure using seal fins is adopted between the rotor vanes 12c and 12d and the turbine shrouds 23c and 23d, positional deviation may occur between the rotor vanes 12c and 12d and the turbine shrouds 23c and 23d, whereby sealing performance may be lowered.

On the other hand, in the present embodiment, movement of the bearing casing 45 relative to the support leg 30b can be restrained. Therefore, displacement of the rotor vanes 12c and 12d which are elements on the side of a rotary body restricted in position by the bearing casing 45 can be restrained, relative to the turbine shrouds 23c and 23d which are elements on the side of a stationary body restricted in position by the support leg 30b. In this way, positional deviation between the rotor vanes 12c and 12d and the turbine shrouds 23c and 23d can be restrained, and lowering in the sealing effect can be restrained.

(3) As described above, the journal bearings 41 and 42 and the thrust bearing 43 are held by the common bearing casing 45, and their outer circumferences are covered together with the weight 38a by the bearing casing 45. In addition, with the journal bearings 41 and 42 located on opposite sides of the weight 38a, the distance between the journal bearings 41 and 42 is secured, which contributes not only to balance of the rotors but also to stable support of the shaft 38. Since the bearing casing 45 surrounds the weight 38a, the journal bearings 41 and 42, and the thrust bearing 43, it has a suitable length in the axial direction. As a result, the bearing casing 45 is supported on the inner circumferential surface of the inner tube 34b of the exhaust casing 34 at two positions in the axial direction by the first support 51 and the second support 52. In addition, as described above, in the structure in which the stage portions are overhung with respect to the bearing casing 45, as the low-pressure turbine 3L of the present embodiment, positional deviation between the rotor vanes 12c and 12d and the turbine shrouds 23c and 23d is liable to occur attendant on the movement of the bearing casing 45.

With such a structure adopted as an object of application, the structure of the present embodiment in which, of the first support 51 and the second support 52 disposed with the struts 36 interposed therebetween, the bearing casing 45 is restricted in position by the first support 51 which is located on the side same as the support leg 30b relative to the struts 36, is particularly effective.

—Modification—

While a configuration in which the support leg 30b is located on the upstream side relative to the bearing casing 45 has been described as an example in the above embodiment, the present invention is applicable also to a configuration in which the support leg 30b is located on the downstream side relative to the bearing casing 45, and in that case, similar advantageous effects as those of the above embodiment can be obtained. Here, the "struts" are located between the "first support" and the "second support," and the "first support" is located on the side same as the "support leg" relative to the "struts." Therefore, in the case where a configuration in which the support leg 30b is located on the downstream side relative to the bearing casing 45 is adopted as an object, struts on the downstream side are fixed to the bearing casing as "first struts" whereas struts on the upstream side are set free with respect to the bearing casing as "second struts." In this case, since the second struts are displaced to the upstream side relative to the support leg and, on the other hand, the first struts are displaced to the downstream side relative to the second struts, movement of the bearing casing restricted in position by the first struts can be restrained like in the above embodiment.

In addition, while a case where the present invention is applied to a two-shaft gas turbine has been described as an example, the present invention is also applicable to a single-shaft gas turbine as long as it adopts a bearing support structure having the same positional relations between the support leg, the struts, the first support, and the second support.

DESCRIPTION OF REFERENCE CHARACTERS

3: Turbine
3H: High-pressure turbine (turbine)
3L: Low-pressure turbine (turbine)
30a, 30b: Support leg
34: Exhaust casing
34a: Outer tube
34b: Inner tube
36: Strut
38: Shaft
38a: Weight
41, 42: Journal bearing (bearing)
43: Thrust bearing (bearing)
45: Bearing casing
51: First support
52: Second support
100: Gas turbine casing
G: Combustion gas

What is claimed is:
1. A gas turbine comprising:
a turbine drivable by a combustion gas;
a gas turbine casing that includes an exhaust casing including an inner tube and an outer tube;
a bearing that rotatably supports a shaft of the turbine;
a bearing casing that holds and covers the bearing;
a support leg that supports the gas turbine casing;
struts that connect the inner tube and the outer tube; and
a first support and a second support that support the bearing casing on the inner tube,
wherein the first support is located on a same side as the support leg relative to the struts in a flow direction of the combustion gas,
the struts are located between the first support and the second support in the flow direction of the combustion gas,
the first support extends from the inner tube to the bearing casing to support the bearing casing relative to the inner tube,
the second support is fixed to the inner tube and is in slidable contact with the bearing casing, and
the first support is attached to the inner tube at a first location and the second support is attached to the inner tube at a second location axially spaced apart from the first location.

2. The gas turbine according to claim 1,
wherein the turbine is a two-shaft turbine that includes a high-pressure turbine and a low-pressure turbine drivable by a combustion gas having driven the high-pressure turbine.

3. The gas turbine according to claim 1,
wherein the turbine is a two-shaft turbine that includes a high-pressure turbine and a low-pressure turbine drivable by a combustion gas having driven the high-pressure turbine,
a shaft of the low-pressure turbine has a counterweight, and
the bearing includes a thrust bearing, and two journal bearings that are disposed on opposite sides of the counterweight.

* * * * *